United States Patent
Rehg et al.

(10) Patent No.: US 6,480,876 B2
(45) Date of Patent: Nov. 12, 2002

(54) SYSTEM FOR INTEGRATING TASK AND DATA PARALLELISM IN DYNAMIC APPLICATIONS

(75) Inventors: James Mathew Rehg, Arlington, MA (US); Kathleen Knobe, Lexington, MA (US); Rishiyur S. Nikhil, Arlington, MA (US); Umakishore Ramachandran, Tucker, GA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/085,795

(22) Filed: May 28, 1998

(65) Prior Publication Data

US 2002/0091747 A1 Jul. 11, 2002

(51) Int. Cl.$^7$ ................................................ G06F 9/00
(52) U.S. Cl. ........................................ 709/100; 709/231
(58) Field of Search ................................ 709/100–108, 709/310–400, 231, 215; 713/400

(56) References Cited

U.S. PATENT DOCUMENTS

| | | | | |
|---|---|---|---|---|
| 3,614,745 A | * | 10/1971 | Podvin et al. | 709/104 |
| 4,843,541 A | * | 6/1989 | Bean et al. | 710/36 |
| 4,965,718 A | * | 10/1990 | George et al. | 709/104 |
| 5,257,372 A | * | 10/1993 | Furtney et al. | 709/105 |
| 5,291,599 A | * | 3/1994 | Cohen et al. | 709/102 |
| 5,664,164 A | * | 9/1997 | Riddle | 713/400 |
| 5,712,976 A | * | 1/1998 | Falcon et al. | 709/231 |
| 5,809,321 A | * | 9/1998 | Hansen et al. | 712/1 |
| 5,819,021 A | * | 10/1998 | Stanfill et al. | 714/15 |
| 5,826,095 A | * | 10/1998 | Jordan | 700/2 |
| 5,923,890 A | * | 7/1999 | Kubala et al. | 712/1 |

* cited by examiner

Primary Examiner—St. John Courtenay, III
Assistant Examiner—Van H. Nguyen
(74) Attorney, Agent, or Firm—Hamilton, Brook, Smith and Reynolds, P.C.

(57) ABSTRACT

A system for integrating task and data parallelism in a dynamic application that includes at least one task for processing an input data stream to produce an output data stream replaces the at least one task with the following components. A splitter task for partitioning the input data stream into a plurality of data chunks. A plurality of worker tasks for processing subsets of the data chunks, each worker task being an instance of the at least one task, and a joiner task combining the processed data chunks to produce the output data stream.

14 Claims, 8 Drawing Sheets

| PARTITIONS | TOTAL MODELS | | | |
|---|---|---|---|---|
| | 1 | 8 | | |
| | MP = 1 | MP = 8 | MP = 1 | |
| FP = 1 | 0.964 (4) | 1.91 (8) | 2.22 (4) | |
| FP = 4 | 0.277 (4) | | | |

FIG. 4

SYSTEM FOR INTEGRATING TASK AND DATA PARALLELISM IN DYNAMIC APPLICATIONS

FIELD OF THE INVENTION

This invention relates to executing applications having dynamically varying resource needs, and more particularly to executing the applications using integrated task and data parallelism.

BACKGROUND OF THE INVENTION

Task parallelism and data parallelism are distinct programming models for describing parallel application software programs.

In the prior art, a task parallel application is typically composed of a set of cooperating processes ("tasks") that are implemented in a framework such as POSIX threads. In a task parallel application, the programmer explicitly defines the communication and synchronization functions between threads in the application. The application relies on the run-time system to schedule the execution of the threads on available processor resources, and to perform load-balancing over the resources.

In contrast, a prior art data parallel application is a single process that operates on distributed data. In a data parallel application, a compiler is usually responsible for generating efficient distributed code where communication overhead is minimized.

There is an emerging class of real-time interactive applications that require a dynamic integration of both task and data parallelism for effective implementation. One such application is described in U.S. patent application Ser. No. 08/844,444 "Method and Apparatus for Visual Sensing of Humans for Active Public Interface" filed on Apr. 8, 1997 by Waters et al., incorporated herein by reference.

There, an interactive, computerized kiosk is described that provides public access to information and entertainment. The kiosk supports natural, human-centered interaction with customers. A camera is used to sense the presence of one or more customers in front of the kiosk. The kiosk provides visual and audio feedback as long as customers are "sensed" in the kiosk's visible environment.

The location and number of customers control the "behavior" of a graphical talking "head" displayed on a monitor. The orientation of the talking depends on the location of the customer in the kiosk area. If there is more than one customer, then the talking head will divide its attention between the customers, much like a group interaction. For example, while talking to one customer, the eyes of the talking head may momentarily shift to others to make them feel part of the kiosk interaction.

The software application program that operates the kiosk has features that are typical of an emerging class of future scalable applications. The application is both reactive and interactive. For example, the kiosk (application) responds to changes in its environment. As new customers arrive, the kiosk will change its mode of interacting.

The application is computationally demanding due to the need for real-time vision, speech, and graphics processing. The application is also highly scalable. At the task level, i.e., processing threads, the application supports variable number of customers and functions. At the data level, multiple video and audio data streams may need to be processed.

At the hardware level, the kiosk application executes on a cluster of symmetric multi-processors (SMPs). SMPs provide a compelling platform for advanced applications such the kiosk system. Systems that use an SMP like architecture are economically attractive. Unfortunately, the flexibility provided by SMP clustering comes at the cost of a hierarchical communication model with multiple levels of locality. Conventional parallel programming models fail to handle one or more of these levels gracefully, making it difficult to program processor clusters effectively.

Applications such as the interactive kiosk exhibit both task and data parallelism. This is illustrated in FIG. 1 which shows a task graph 100 for a basic vision application 100 within the total set of kiosk applications. The vision application tracks multiple customers in the kiosk environment according to, for example, the color of their clothing. In FIG. 1, two basic constructs are used, the nodes represent tasks, or execution threads, and the edges or "pipes" connecting the tasks are data flows.

A camera 101 is connected to a digitizer task (D). The camera 101 continuously monitors a scene in front of the kiosk. The digitizer task 110 produces a sequence of frames 111 at a predetermined rate. Each frame is composed of a plurality of picture element (pixel) values. A histogram task (H) 120 analyzes the frames to determine a predominant color of the clothing worn by customers standing in front of the kiosk. The histogram task 120 or "color tracker" produces color models 121. Concurrently, motion masks 131 are produced by a change detector task (CD) 130 that also analyzes the frames 111. The color models 121 and motion masks 131 are used by a target detector task (TD) 140 to track individuals in the scene.

Task parallelism is most obvious in the histogram task 120 and the change detection tasks 130 which have no data dependencies. That is, these two tasks can operate on their own copies of the same frames 111 at the same time. Task parallelism is also present in the form of pipelining, for example, the digitizing task 110 and the target detection task 140 can be performed simultaneously on different frames in the sequence.

Data parallelism is present in the target detection task 140 where multiple color targets (customers) can be detected in parallel. Potentially it should also be possible to exploit data parallelism in the change detection and the histogram tasks. For example, a single frame could be partitioned into a plurality of regions, and the regions, such as quadrants, could be processed in parallel.

Applications, such as the kiosk application, are not well-supported by either the task or the data parallel model alone because the kiosk application is made up of multiple distinct tasks which each provide opportunities for data parallel processing. As a result, maximum performance is not achieved under the task parallel model, and the application as a whole does not neatly fall into a traditional data parallel model.

Effective implementation of such real-time, interactive applications requires a hybrid parallel model that integrates both task and data parallelism within a single framework. Hybrid models that integrate task and data parallelism have been proposed in the prior art. Unfortunately, previous approaches require either a static problem domain, or a highly restricted application domain such as is found in numerical linear algebra.

One prior art system describes a framework for exploiting task parallelism in dynamic multi-media applications such as the color tracker. This work is described in U.S. patent application Ser. No. 08/909,405, "Space-Time Memory" filed by Ramachandran et al. on Aug. 11, 1997. That system was designed to match the dynamic data flow and heterogeneous task requirements of multi-media applications involving, for example, concurrent video and speech processing.

In that framework, tasks are implemented as threads, and the run-time system relies on the operating system to effectively schedule processor resources. That prior art task parallel system lacks any type of mechanism for incorporating data parallelism into its framework.

A number of prior art task parallel systems do include integrated task and data parallelism, the "Orca" and the "FX" system are two examples. However, Orca falls short in that its data parallelism is not only static, but also specified explicitly in the source programs of the application. The FX system is significantly more advanced. It automatically determines optimal mappings of tasks to processors in static domains where the flow of the computation does not vary as a function of the data, but remains fairly consistent over a variety of data sets.

Unfortunately, the parallelism exhibited by multi-media applications, like the color tracker above, is often highly dynamic, because the required processing is determined by the video content, for example, the number of customers in the scene at some point in time. As a result, such applications do not derive any benefits from compiler or profile driven analysis. Profiling is a technique wherein an executing application is measured in order to tune performance.

This critique extends to a large body of work involving the use of profile data to drive compilation and resource scheduling for parallel applications. All of these systems, of which FX provides an example, perform static task scheduling based on performance profiles. Application profiling is used to measure the performance of individual tasks, the measured performance is used as input to static scheduling decisions for system resources.

Unfortunately, this body of work does not provide a means to dynamically adjust the scheduling policy as resources needed by the application change over time. Profiling systems typically support off-line operations such as compilation and resource scheduling prior to run-time, and fall short of the on-line adaptation required by a dynamically varying class of applications.

Integration of task and data parallelism in a dynamic setting has been addressed for scientific applications involving parallel matrix computations. In this domain, the task graph has a regular structure, and models are available for characterizing the efficient of tasks in utilizing additional system resources.

Algorithms for on-line scheduling of dynamic tasks sets have been proposed in this context. Unfortunately, the computational model which describes scientific matrix computation does not apply to multi-media processing where the tasks are heterogeneous and involve processing a time-varying data stream as opposed to a static matrix.

On-line adaptation of resource scheduling policies for parallel applications has also been explored in other, more limited contexts such as page migration and replication in a CC-NUMA architecture. In this prior art work, measurements of cache or translation look-aside buffers (TLB) misses are used at run-time to make decisions about migrating or replicating cache pages within the context of a cache coherent shared memory architecture. Unfortunately, this type of work is of limited scope as it depends heavily on the properties of the CC-NUMA architecture. As a result, it falls short of providing a complete framework for addressing both task and data parallelism.

Another on-line adaptation scheme based on reinforcement learning has been proposed in the context of network packet routing. That scheme makes local decisions about packet routes according to a model of delivery times that is updated as the network traffic varies. Unfortunately, there is no obvious extension of that scheme to integrated task and data parallelism in a multi-processor computer system including a variety of different and competing resources. The complex behavior of a parallel computer systems can not be fully characterized by simple local interactions of system components.

Multi-media applications, such as the kiosk application described above, have two characteristics which differentiate them from more traditional parallel scientific applications. First, multi-media applications posses a high degree of dynamism within a heterogeneous task set. For example, the color tracker depends on the contents of the frames to determine which task procedures should be applied.

These procedures can differ significantly in their computational properties, at least when compared to scientific applications. Second, the kiosk application demands real-time processing of dynamic data streams. For example, the color tracker must process the frames nearly at the rate the frames are produced by the digitizer. This mix of requirements can lead to patterns of communication that are substantially different from scientific applications in which data sets, such as matrices, are available in their entirety at run-time.

There is a need for a framework for integrated task and data parallelism that can be tailored to the dynamic real-time needs of multi-media applications. This framework should be applicable to a broad range of heterogeneous tasks.

Because it is unlikely that an exact characterizations of the computational properties of a diverse task set will be available prior to run-time, the framework should also provide a mechanism for adapting the scheduling policy according to system performance. What is desired is satisfactory solution where a scheduling policy improves over time as the computational properties of the application become apparent.

There are two requirements for this framework. The first requirement arises from the fact that the relative computational requirements of the tasks vary over time. For example, the computational requirements of the target detection task varies with the number of customers perceived by the kiosk, whereas the computational requirements of the digitizer are fixed. This implies a requirement that the relative extent of data parallelism versus task parallelism must dynamically track changes in the application.

The second requirement is the need for adaptation. The system must adapt to hardware and software modifications, the later including both application software and system software. Similarly, the performance of the system should improve over time given fixed hardware and software.

This type of framework is conceptually different from the highly analytic approaches to scheduling in narrow application domains which have characterized the prior art on integrated task and data parallelism.

SUMMARY OF THE INVENTION

The invention provides methods and means for integrating task and data parallelism for dynamic applications where the applications include one or more tasks or processing threads.

Parallelism is achieved replacing a particular task which needs additional system resources with the following general component tasks, a splitter, workers, and a joiner. The splitter task partitions the input data stream to the particular task into a plurality of data chunks. The worker tasks process subsets of the data chunks, each worker task is an instance of the particular task. The joiner task combines the processed data chunks to produce the output data stream.

This type of task and data parallelism is useful in situations where the data chunks are continuously generated and time-varying in complexity such as a sequence of time-ordered video frames, and the complexity of the processing depends on the video content.

In one aspect of the invention, the chunks are placed in a work queue, and the control items are placed in a control queue. The control items indicate how the joiner can combine the processed chunks to reform the output data stream. In addition, each chunk is associated with a task and data parallel strategy that indicate methods to be applied to the chunks. The methods, for example, can be copies of the particular task, or models to be applied to the data by the worker tasks while processing the chunks.

BRIEF DESCRIPTION OF THE DRAWINGS

FIG. 4 is a table comparing experimental results obtained for the dynamic data parallel construct;

DETAILED DESCRIPTION OF PREFERRED EMBODIMENTS

Introduction

In a general sense, we disclose a system that can be considered as having two complementary parts. A first part provides integrated task and parallelism for software application programs with dynamically varying computer system resource needs. Our system is particularly suited to support communication and macro data-flow requirements of multi-media applications processing complex data streams in real-time, for example, a sequence of video frames. The system provides for instantiating data parallelism within tasks.

The second part determines an effective ration of tasks and data parallelism among tasks. We describe a general method for adaptive task and data parallel strategies based on on-line and off-line performance modeling. This makes it possible to employ machine learning techniques to build and adapt models of task performance, and to explore strategies for mapping tasks to processors.

PART I
Data Parallelism within a Task Parallel Programming Model
A first step in developing an integrated task and data parallel system is to define the representation of parallelism. We augment an explicit task parallel representation with additional primitives that can express data parallelism. For multi-media applications, it is appropriate to begin with a task parallel framework, as data parallelism often naturally occurs within the context of a task such as image processing. Furthermore, the heterogeneous nature of the tasks makes it desirable to explicitly represent task parallelism.

Figure 2:
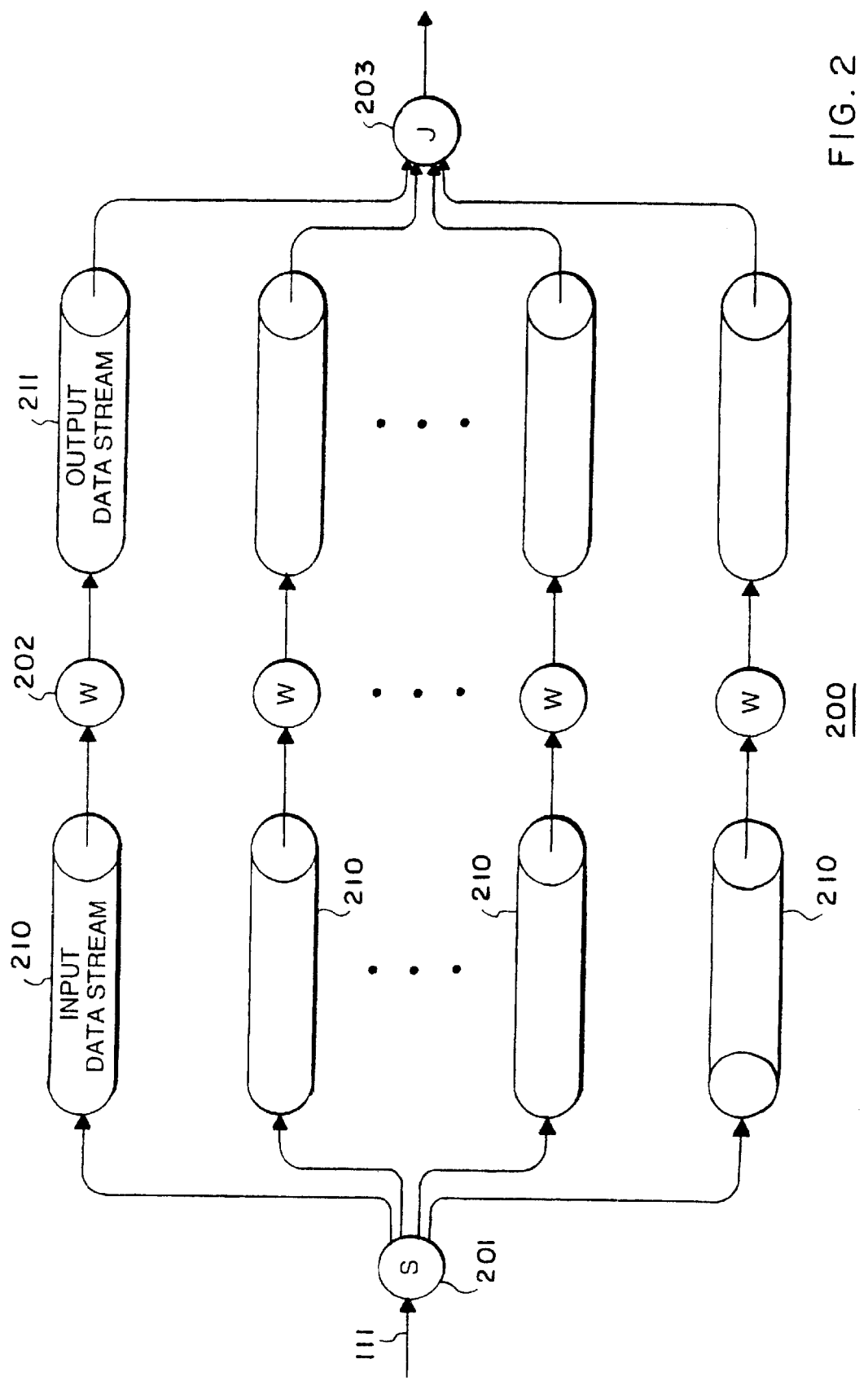
FIG. 2 a task graph of an application using a static data parallel construct.

FIG. 2 shows a task graph 200 for the color tracking (target detection) 140 task described above. The dependencies in the graph 200 determine the task level parallelism. The task parallel framework we require for applications like the color tracker differs substantially from the standard approaches for describing task parallelism.

In particular, the color tracker 140 requires a dynamic framework. By having a dynamic framework, adaptive processing of time-varying data can be supported. Therefore, in our system, computations described by the task graph 200 are adaptive operations performed on a time-varying stream of input data. As a result of these constraints, our framework for integrating data parallelism into a task parallel framework differs substantially from earlier approaches to this problem.

Our description, in part, relies on the description given for the "Space Time Memory" (STM) system cited above. However, the present techniques would apply equally well to any system for task level parallelism that supports processing of streams of time-varying data.

The STM system is designed to operate on a network of heterogeneous processors, which we refer to as "clusters." STM provides a loose temporal synchronization to process data. One particular aspect of STM which is significant here is a high-level data sharing mechanism. Automatic garbage collection simplifies the communication of time-varying data between threads in the application.

An edge 210 in the graph 200 represents the communication of a stream of data between two tasks. The term stream is emphasized for two reasons. First, the data are continuous, for example, a sequence of video frames, and not some static block of data neatly organized in a matrix. Second, the complexity and rate of flow of the data to be processed varies significantly. For example, in an interactive kiosk environment, an empty scene requires fairly little processing, if any at all. Tracking a single customer is substantially more difficult. Tracking multiple moving customers, perhaps crossing in front of each other is a significantly difficult problem.

In the STM system, the edges 210 are implemented as "ports." Ports support storage and access to arbitrarily complex data types based on time-stamps. A task can attach to one or more ports to gain access to a data stream. When the task completes, it can detach from the ports. Time-stamps describe the temporal evolution of data in the stream. For example, in the case of the color tracker, the time-stamps can be frame numbers. In one sense, ports can be viewed as first-in first-out (FIFO) queues with a relaxed temporal ordering for the purpose of processing. The ordering is relaxed in that time-stamped data items on the queue can be processed out-of-order, or in parallel as here.

STM provides data access primitives for reading and writing time stamped data items. These primitives implicitly handle synchronization between producers and consumers of data items and garbage collection of data items that are no longer needed. We provide a framework for performing tasks with collections of data parallel threads. This can be viewed as an extension of the basic STM framework to support data parallelism within a given task.

The key insight is that any selected node (task) in an arbitrary task graph, for example, node 120 of FIG. 1, can be replaced with a sub-graph 200 as follows. A splitter task (S) 201 partitions the data stream that normally would be the input for the selected task, for example, sequence of frames 111 on an input port for the task, into multiple data "chunks." A data chunk can be a quadrant or some other portion of a frame. Alternatively, a chunk can be a number of sequential frames. In other words, chunks can be expressed as a function of data items, smaller or larger. Data chunks can be assigned to separate ports 210 or input streams for the task, and an instance of the selected task is assigned to each input data stream.

We call these instances of the selected task worker tasks (W) 202. Each input data stream is processed by the worker task 202 to produce an output data stream 211. A joiner (J) 203 combines the processed data of the parallel output data streams. This sub-graph 200 exactly duplicates the behavior of the original task 120 as viewed on its input and output ports.

We will describe the general form of the data parallel sub-graph which may be applied to any node in a task graph. The actual processing performed by the nodes of the sub-graph depends upon the application. If a task T has N "worker" instances in the sub-graph, then each worker will process about one Nth of the data.

The splitter task 201 reads from the input port that normally would be used by task T, and converts the single data stream into N parallel data streams, one for each of the workers 202. The joiner 203 combines the N partial results from the workers into a single result, which it places on its output port. The splitter and joiner tasks provide the interface between the worker tasks, and the rest of the task graph. The splitter and joiner ensure that the data parallelism within T is not visible to the rest of the application.

The extent of the data parallelism employed is determined by the number of worker tasks. Each worker task implements a parameterized version (instance) of the original application program, designed to work on arbitrary parts of the data stream.

For example, if the stream is a sequence of frames, and each frame includes pixel values, then distribution across pixels can be accomplished by passing image regions, e.g., frame quadrants, to the worker tasks. Note that distribution across entire frames can also be handled: the splitter reads and passes multiple frames to the workers, and the joiner places the processed frames on its output port.

The data parallel approach of FIG. 2 is static in that there is a fixed assignment of data chunks to workers, and a fixed number of worker tasks. Note, however, that the splitter does not have to wait until one set of chunks has been completed before sending the next set of chunks to the workers. In its simplest form, a static task and data parallel construct may be useful for applications that do not have time-varying resource needs. However, we are also interested to provide a construct that can provide parallelism in a dynamic environment.

Dynamic Task and Data Parallel Strategy

The static assignment of chunks to workers in FIG. 2 may be unnecessarily restrictive. It limits the flexibility of the splitter 201 to respond to changes in the task and makes it difficult to vary the number of workers. In the color tracking task, for example, the splitter's strategy should vary with the number of targets, as we will describe in our experimental results described below.

Figure 3:
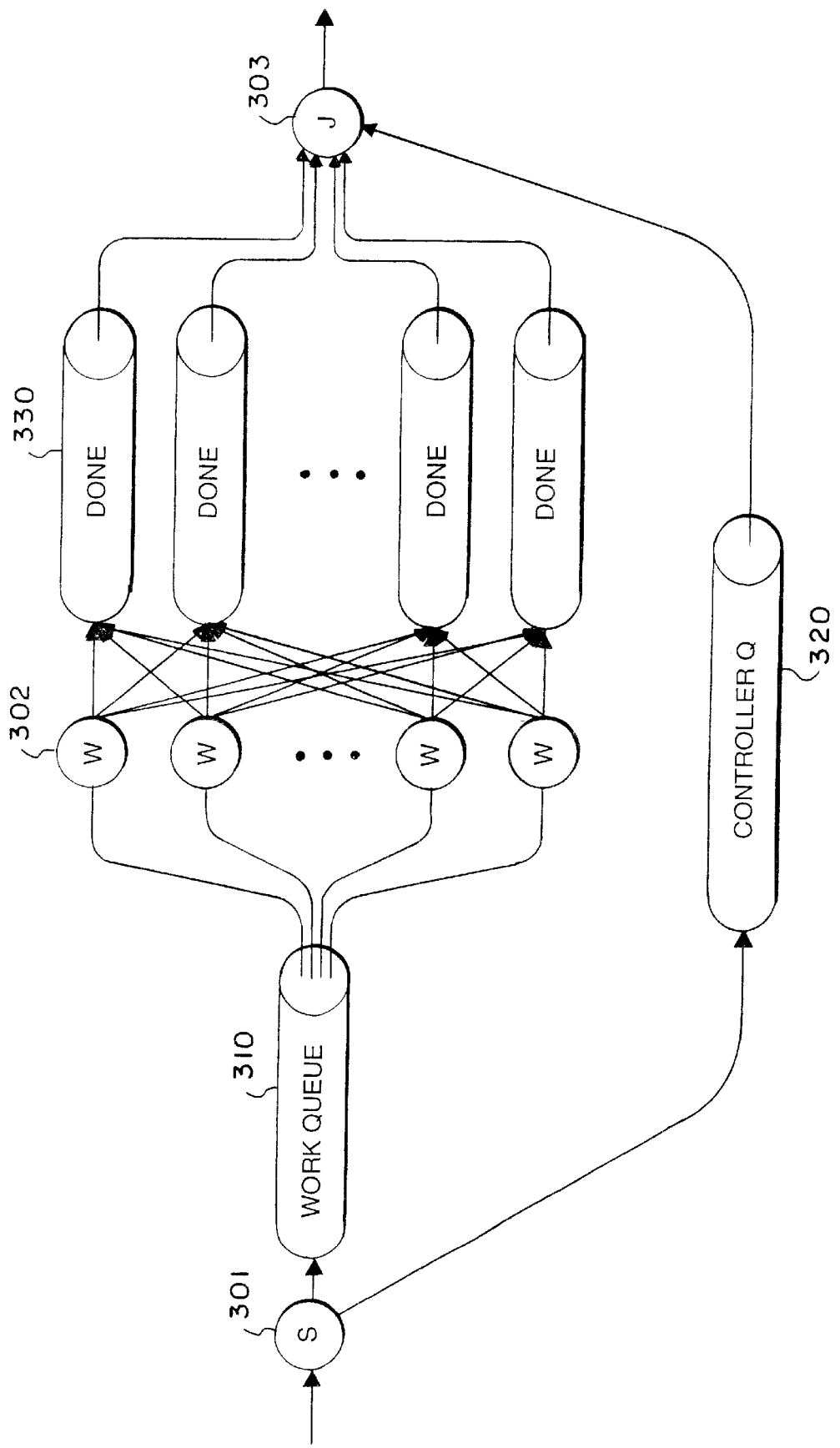
FIG. 3 is a task graph of an application using a dynamic data parallel construct.

FIG. 3 illustrates a dynamic data parallel architecture that avoids the limitations of the static approach. Here, a single work queue 310 acts as the source of data chunks for all of the worker tasks 302. The work queue 310 supports the dynamic assignment of chunks of data according to worker availability. Any available worker task may process the next awaiting chunk of "work," i.e., data on the work queue 310. This strategy allows multiple workers to cooperate in processing a port data item while making it easier to vary the number of worker tasks, N, during execution.

The splitter 301 divides an item of work into M chunks, where we no longer require that M=N. In other words, the dynamic partitioning of the data here does not exactly require a one-to-one correspondence between input streams and tasks. In fact, M may vary with each item provided that $M \leq M_{max}$. In the static scenario, the joiner 203 knew the number of chunks for each item, and where to find them.

Here, the splitter 301 communicates its task and data parallel strategy for each data item, including the number of chunks, to a joiner 303 through a single controller queue 320 storing control items. The control items can be structured like the data items above. The control items indicate how the data items of the input data stream are partitioned into chunks, and therefore how processed chunks are to be recombined. The workers 302 communicate with the joiner through $M_{max}$ done ports 330.

The splitter 301 tags each chunk with its target done port. A chunk i goes to done port i. This mechanism allows any worker to process any chunk because the done ports act as a sorting network for the results. The joiner 303 reads the partial results from the appropriate done ports, combines them, and outputs the complete result.

In applying this framework to a particular task, the application can define a chunk type, and/or supply parameterized splitter, worker, and joiner methods. In other words, if only a small number of strategies are defined, these can be stored in a table, and the chunk type can be used as an index. If the number of permitted strategies is large, than the actual methods to be applied during processing can be passed along with the chunks. Alternatively, the chunks can be typed at the source language level to dictate possible task and data parallel strategies.

We refer to a single set of methods as a task data parallel strategy for the task. In cases where there are multiple ways to parallelize a given task, the application may define a family of data parallel strategies as we describe in the experimental result section. Depending upon resource availability, this abstraction will automatically create the necessary ports (input and output streams) and tasks by invoking these application-provided methods to generate the structure depicted in FIG. 3.

Our system can also use machine learning techniques described below. The technique will "learn" two types of parameters of the task and data parallel strategy. A short term task and data parallel strategy is determined by application-specific parameters for dividing the data into chunks. A long term task and data parallel strategy is determined by the number of worker tasks N assigned to each task, and the policy for scheduling the tasks on the available processors.

The dynamic task-data parallel architecture depicted in FIG. 3 bears a superficial resemblance to more traditional approaches for incorporating data parallelism into a task parallel abstraction. Here we summarize the three key attributes of our architecture which distinguish it from the prior art.

Our system is explicitly designed to support dynamic task and data parallelism, in which both the task and data parallel strategy, and the number of processor resources can change during execution, and even for each chunk of data, for example, frame, processed. Because the splitter communicates the strategy to the joiner through the controller queue 320, the splitter can change its strategy on the fly without affecting the correctness of the computation. The sorter network makes the joiner's task simple, while permitting the worker tasks to process chunks of work opportunistically.

Our system is modular in the sense that the instantiation of data parallelism for one node in the task graph leaves the rest of the task graph unaffected. This modularity allows effective task and data parallel decompositions of a given application. Modularity makes it possible for the learning system to explore the effect of adding data parallelism through a series of local changes to the task graph.

Our system is well-matched to the requirements of applications that must process time-varying streams of data in real-time. For example, as we will illustrate below our system supports a wide range of data parallel strategies, including pipeline parallelism. In contrast, conventional task graphs usually describe a set of operations on single static data set.

Experimental Results

Figure 1:
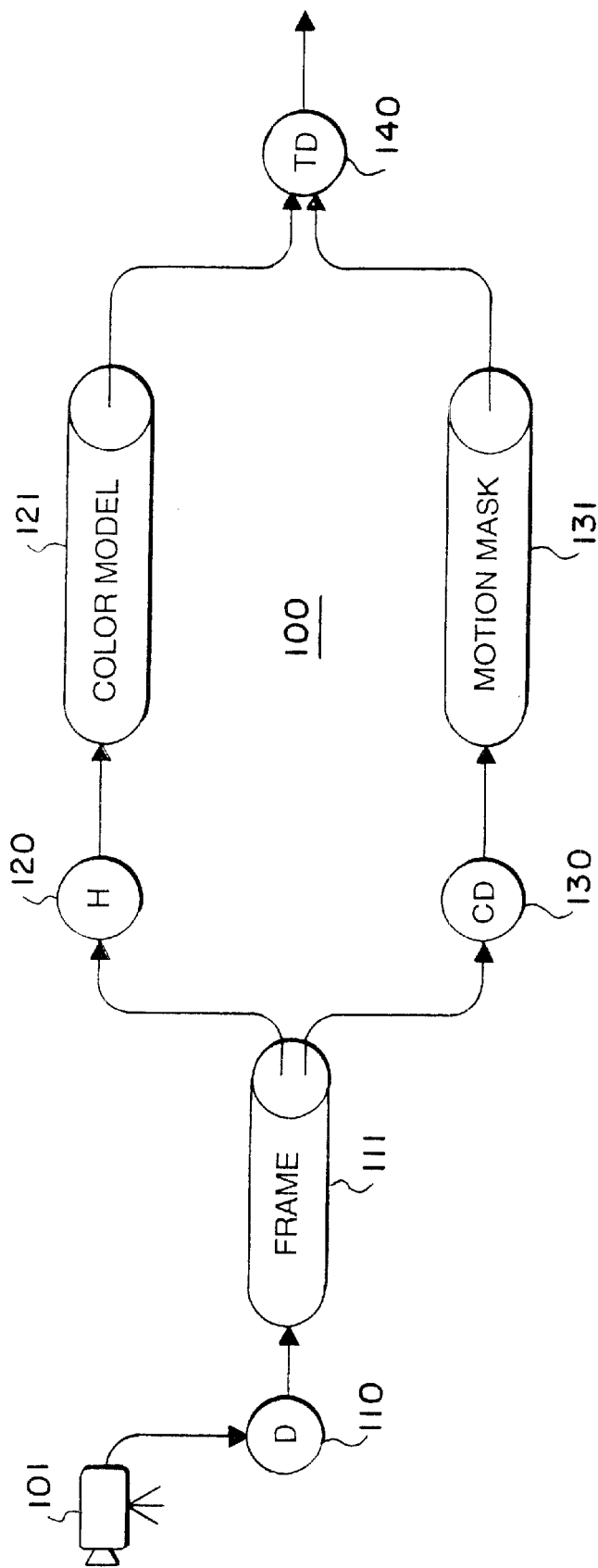
FIG. 1 is a task graph of a multi-media application that can benefit from integrated task and data parallelism.

To illustrate the flexibility of our data parallel solution, we now describe its application to the color tracker example of FIG. 1. In this case, there are three distinct ways to exploit data parallelism in the application. The color tracker operates on two data types, image frames, and target color models. The tracker data space can be therefore be characterized as the cross product of frames, pixels in each frame, and models. This results in three distinct approaches to data parallelism: distribute models, distribute parts of the same frame, and distribute distinct whole frames.

To implement distribution over L color models, the splitter creates L chunks of work from a single frame, where each chunk contains the frame and a single color model. In distributing over parts of a frame, the splitter divides the pixels in a single image into R regions. For example, R=4 when dividing the image into quadrants.

The splitter creates R chunks of work, each chunk representing the search for L models over all of the pixels in a single region. Finally, to distribute distinct frames, the splitter reads frames from its input port, and inserts the frames directly into the work queue. These chunks of work can be processed concurrently by distinct workers. In this scenario each chunk corresponds to a search for L models across the entire frame. Combinations of these three approaches are also possible.

It is worth noting that the task and data parallel strategy of distributing distinct frames is equivalent to pipelining and increases the throughput of the system in the case where it takes less time to generate a frame than to process it. In contrast, the two strategies of distributing color models and regions will reduce the latency by reducing the time it takes to process a single frame. We have implemented and experimentally evaluated the two latency-reducing strategies for the target detection task which is the performance bottleneck in the application, see FIG. 1.

The cost of target detection is dominated by an algorithm called histogram back projection (HB). In HB, each pixel in the input image is compared to each of the target models, which are color histograms. This comparison step results in a set of images, one for each target, in which each pixel location has been labeled with the likelihood that it came from that target model. After filtering these images to remove noise, "blob" detection is used to identify target locations.

In parallelizing the HB algorithm for a single frame, we can divide the data by target models, or by image regions. When the number of target models is smaller than the number of processors available for data parallel work, distribution over regions is the only option. But as the number of models increases there is a choice. As a result of pixel dependencies in the filtering and blob detection steps, we would expect distributing over regions to result in increased overhead in the form of duplicated work along the boundaries. For the case of eight models, the timing results shown in FIG. 4 demonstrate the superiority of distribution over models.

FIG. 4 shows the total time to detect all targets in a single frame. In this experiment, there were two regimes, in which the total number of models was one and eight. The model and frame data are both partitioned. MP gives the number of partitions of the models, and FP the number of partitions of the frames. The total number of chunks in each experiment, shown in parentheses, is the product of MP and FP. For example, in the case MP=8 and FP=1, each of eight chunks searched for a single model across the entire frame. The experiments were performed using four worker tasks on a four processor symmetrical multi-processor, for example, the Digital Equipment Corporation AlphaServer 4100.

In the case where the total number of models is one (first column), we tested the sequential approach of searching an entire frame of the sequence as one chunk (FP=1) against the task and data parallel strategy of dividing the frame across four chunks (FP=4). The parallel approach was faster, as expected, by more than a factor of three.

In the case of eight total models, we tested two strategies corresponding to partitioning the data across models (MP=8), and across frames (FP=4). While both of these solutions are nearly three times faster than a sequential implementation, the division across models was 17% percent faster than the division across pixels due to the increased overhead from the smoothing step.

These results demonstrate that dynamic strategies even improve a relatively simple vision algorithm which itself makes up only a small part of the complete kiosk application. As additional vision, speech, and graphics functionalities are implemented, an even more complex set of dynamic choices will have to be made.

PART II

Learning Effective Integration of Task and Data Parallelism

Given a framework for expressing data parallel operations within the context of a task parallel architecture, the remaining challenge is to determine the mix of task and data parallelism that results in the best application performance. We will refer to this as the search for a task and data parallel strategy because we will essentially be adding data parallelism to a task parallel graph.

The problem of determining a good task and data parallel strategy is especially challenging for multimedia applications, like the kiosk application, in which the optimal strategy is dynamic, and depends upon the state of both the application and the hardware resources.

For example, as we demonstrated above, the optimal strategy for minimizing latency in the color tracker depends upon the number of color models relative to the available processors. Essentially, when there are fewer models than processors, it is better to distribute over regions, otherwise it is better to distribute over models. For a single application like the example shown in FIG. 1, it is possible to manually explore the space of task and data parallel strategy through analysis and experimentation.

However, as the system becomes more complex, the number of possible strategies will grow, and manual exploration becomes infeasible. Unfortunately, unlike other application domains such as scientific computing or databases, complex applications like the kiosk application are composed of a heterogeneous mixture of tasks whose computational properties are not well-understood. It is therefore less likely that the space of data parallel strategies can be characterized prior to run-time.

We solve the problem of task and data parallel strategy selection by machine learning. Our approach is based on two key insights. Learning techniques can be used to model the complex relationships between a parallel implementation of an application and its performance. By treating the application and its hardware resources as a "black box" whose properties can be modeled from data collected during the application's execution, we sidestep the need for accurate task characterization or extensive knowledge of the application domain which limit previous solutions to task and data parallel integration.

There is an analogy between choosing a task and data parallel strategy and learning a control law for a physical system which can guide our choice of a learning methodology. As a result of this insight, we use efficient memory-based learning techniques which require modest amounts of data and support real-time operation.

Figure 5:
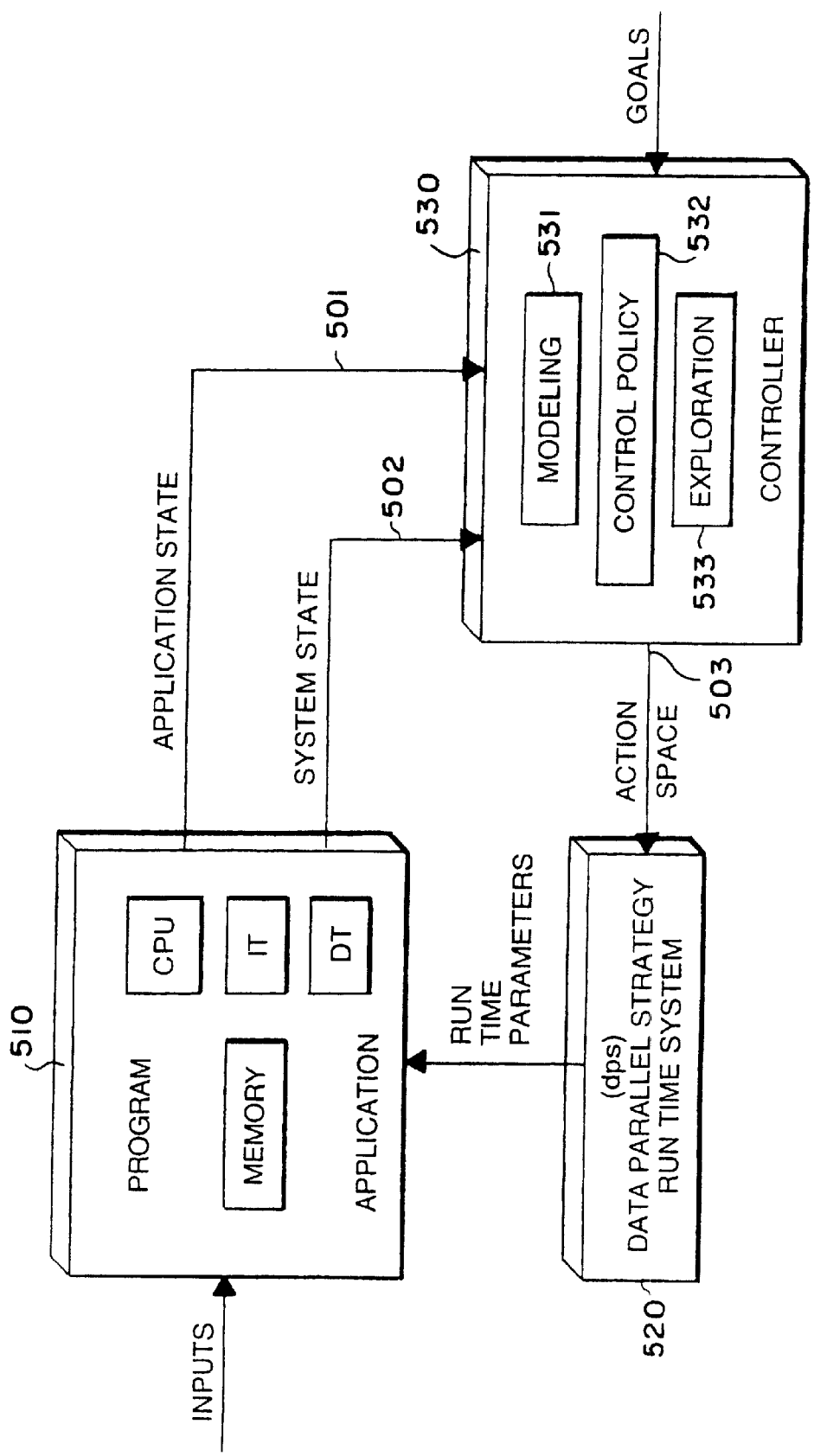
FIG. 5 is a block diagram of an adaptive learning system that can be used with the dynamic construct of FIG. 3.

The main components of our learning-based method are depicted in FIG. 5. There are three main components: an application 510, a run-time system 520, and a controller 530. The application refers to the application program and data structures stored in a memory, along with CPU resources they utilize. This is the part of the system that is visible to the user, and its performance is the key concern.

The state of the application 510 is described by two sets of variables. Application state 501 describe the application itself and are only meaningful in its context. An example would be the number of color models in the color tracker. The system state 502 includes parameters such as latency or processor utilization which describe the CPU resources and are usually related to the performance goals of the application.

The run-time system 520 implements the task and data parallel strategy, and provides a mechanism for measuring the application and system states. The data parallel behavior of the run-time system is described by a set of action space parameters 503 (action vectors). The action space represents all possible run-time instantiations of the application 510.

Figure 6:
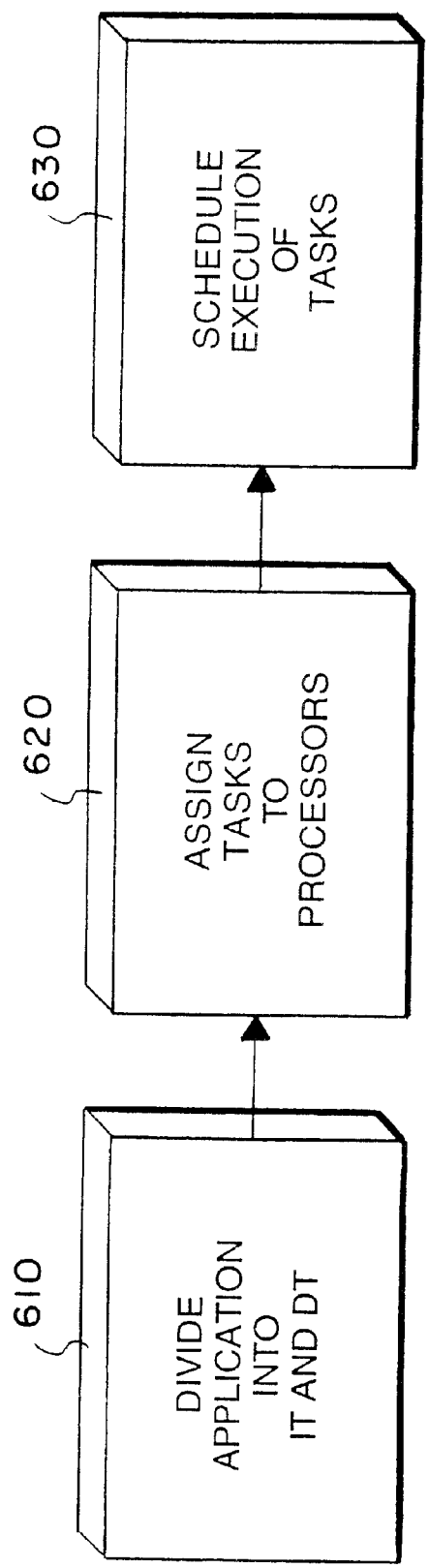
FIG. 6 is a flow diagram of a method used by the system of FIG. 5.

FIG. 6 shows the three main steps the run-time system 520 must perform in executing a parallel application. The first step 610 is the division of the application 510 into interacting tasks (IT) and data parallel threads (DT), i.e., processes that are copies of the task. The second step 620 is the assignment of these tasks to processors in the cluster. The third step 640 is the scheduling of the execution of the tasks on each processor. For simplicity, we will first focus on the first step of determining the relative proportion of interacting tasks and data parallel tasks in the application.

In this scenario, the action space 503 parameterizes all possible data parallel instantiations of the application's tasks. For example, under the framework described above, each node in the task graph has a parameterized data parallel implementation following FIG. 3. An action vector is formed by concatenating the data parallel parameters for each node. This strategy results in an action space whose dimensionality grows linearly with the number of tasks in the application task graph.

To continue the example, in describing the application of FIG. 1, there are four action variables: one variable each for a color histogram task and change detection task. These two variables describe the number of data parallel partitions of each input frame. There are two action variables for a target detection task, the first variable describes the number of image partitions, and the second variable describes the number of color model partitions.

An action vector [1 1 1 1] results in a strictly task parallel implementation of the color tracker with exactly one thread per task, while an action vector [1 1 1 8] corresponds to the (FP=1, MP=8) FIG. 5.

The remaining steps of assigning tasks to processors and scheduling their execution can be handled by the run-time system in conjunction with the operating system. For example, tasks can be assigned to a cluster of processors based, for example, on data localities and the threads can be scheduled according to the POSIX model. Note however these decisions could also be handled within our learning approach by augmenting the action vector, and adjusting the control policy.

The controller 530 sets the task and data parallel strategy for the application through the action vectors 503 passed to the run-time system. By issuing an action and observing its effect on the application and system states, the controller 530 builds a model that characterizes the application's performance. The model is then queried to determine the appropriate action given a desired performance goal for the application 510.

The controller includes three basic components: modeling 531, control policy 532, and exploration 533. The modeling component 531 includes a representation of states and actions, and methods for building the representation from sample data provided by the run-times system. The control policy component 532 describes how the state-action model is used to modify the behavior of the run-time system 520, and thereby determine the performance of the application 510. The exploration component 533 specifies data points to be used during modeling are obtained.

Modeling

The modeling component 531 lies at the heart of the controller 530. There are many possible representations for the states and actions, and many methods for building models. It is conventional to distinguish between forward models, which describe the effects of actions on the states and goals, and inverse models which describe the actions required by state goal pairs. In general, both types of models are useful, and they can be used in concert.

If q denote the state vector, a denote the action vector, and g denote a goal vector, then a forward model is a function f: (q, a)→g. Similarly, an inverse model is a function $f^{-1}$: (g, q)→a. In this terminology, the goal vector g is any vector function of q that describes the desired behavior of the application.

For example, g might provide a formula for the latency of the system expressed in terms of the system state. Forward models are descriptive in the sense that they capture the effect of actions without expressing any explicit preference for a particular action. In contrast, inverse models are prescriptive in that they describe the action that should be taken given the state and desired goal.

It may be possible to derive an inverse model from a forward model by inverting f for each (g, q) pair in the state space. This inversion can be done by searching for the action a which comes closest to the desired g given q. In general, however, there is no guarantee that f is one-to-one, with the consequence that the inverse model could be undefined.

In the remainder of this section, we will focus on learning a forward model for the state action spaces that describe data parallel strategies. We will return to the issue of model choice in the following section when we describe control policies.

There are many different function approximation methods which can be used to learn representations for f given pairs of input and output data. Some examples include neural networks, regression trees, and radial basis functions. We prefer memory-based, "lazy" learning using locally weighted regression with polynomial kernels.

There are two key ideas behind this approach. In memory-based learning, the desired function is represented implicitly by the set of observed input-output data pairs, which are organized into a data structure such as a kd-tree which supports fast nearest-neighbor look-ups. Regression over the data to answer a query about the function value at a specific point is performed on-line at query time. Hence this is a type of lazy evaluation.

In locally weighted regression, the desired function f is modeled in the neighborhood of a point x by a simple functional form, such as a quadratic or cubic polynomial, which is fit using only the data points within some neighborhood of x.

This combination of memory-based representation and local regression has several appealing attributes for learning task and data parallel strategy. It has previously been employed with some success to the analogous problem of robot control learning. Memory-based methods have two critical advantages over other approaches.

First, because memory-based models defer the cost of regression to query time, they do not have to build models in parts of the state space that are not traversed by the system. Second, the low cost of inserting a new measurement into the model data structure makes them quite suitable for on-line learning. The "laziness" of memory-based learning provides a significant advantage in our application because the size of the action space can be very large because memory-based learning encodes all possible data parallel strategies for the application.

At the same time, there are likely to be significant portions of the state space which are traversed infrequently, or not at all. For example, in the color tracker, the application may spend a majority of its time processing images which contain only a single figure, which corresponds to a search for one color model. Therefore, it makes sense that the learning strategy spends spend significantly more time building a representation for this sub-space than for the sub-space where the number of color targets is greater than one.

Support for on-line learning is also appealing, as described in greater detail below, because it opens up the possibility of using the quality of an evolving model to actively guide the exploration of the state-action space during execution of the application. The low cost of gathering data combined with the slow rate of change in the task and data parallel strategy relative to the execution of the application suggests that the cost of on-line learning may not have a dramatic impact on run-time overheads.

The choice of a locally weighted regression rule strongly complements the use of a memory-based representation. Locality means that an observed data point has an immediate effect on the function approximation in its local neighborhood. It is therefore fully incorporated into the model after one presentation.

This is in contrast to a more global representation such as a fully-connected neural network where a point must be presented several times before it can have its maximum effect. Thus local regression may require less data than other methods. Also, by restricting the neighborhood size the cost of a regression operation can be kept low, in support of on-line learning. For example, in simple state spaces regression could simply be the nearest neighbor rule, which would select as the output for f(x), the observed value of f at the closest training point x.

An additional advantage of the local regression rule is its flexibility. There are simple techniques for controlling the amount of smoothing, i.e., neighborhood size, rejecting out-liers, and removing older data points from the model. Moreover, these decisions can be automated through the use of cross-validation.

Control Policy

Given a forward or inverse model for the state-action space, the control policy component determines when an action should be taken to change the task and data parallel strategy, and which action will be selected. Our learning is based on an analogy to learning control systems in which a learned model of a physical system is used to synthesize and adapt a control law.

There are two aspects to this analogy. The first has to do with the use of feedback to reduce vulnerability to modeling errors. Feedback as described for dynamic systems, such as robotic controllers, is equally relevant to the problem of selecting and executing task and data parallel strategy based on learned models. However, the control analogy also raises the question of whether a mixed task and data parallel application could exhibit non trivial dynamics not found in robot control.

In actual practice, the selection of a control policy for a physical system such as a robot arm is heavily influenced by the plant dynamics, the available actuators, and the level of confidence in the estimated model parameters. With respect to these criteria, the color tracker appears to be a highly favorable system to control.

In the time scale of the task and data parallel strategy, the application would seem to change state almost instantaneously. Moreover, any desired task and data parallel strategy can be commanded. Inputs to a software run-time system are not limited by energy and force considerations to the extent that they are for a physical system. In addition, it seems likely that the state of a parallel system can be measured with much higher accuracy than the state of a physical system such as a robot end-effector. Note, that the system states are likely to be the only state variables that are relevant from the dynamics viewpoint, since it is unlikely that the choice of task and data parallel strategy will have significant impact on the application states.

However, it is possible that a user could write an application whose system state did exhibit more complex dynamics, possibly by simulating an existing physical system in a certain way. Therefore, in the remainder of this section we will briefly describe three types of controllers: open-loop, dead-beat, and the Linear Quadratic Regulator (LQR). These are listed in order of increasing robustness to limitations in modeling and actuation, and therefore the order also corresponds to increasing computational cost. It is likely that simple open-loop or dead-beat controllers could be adequate in many cases, but in general the choice will depend on the properties of the application and run-time system.

We begin with the open-loop control policy, which is the simplest possible regulator choice. At each decision point, this policy evaluates the inverse model and takes the action that is specified by the current state and goal. In practice, the run-time system compares the commanded action to its current task and data parallel strategy to decide whether a change in the mapping of the application is required.

In practice, open-loop control policies suffer from several problems. First, on-line learning rules may become trapped in local minima when the relationship between goal and action is non-monotonic. Also open-loop policies are known to be sensitive to modeling errors, since they rely on the accuracy of the inverse map. If a given action fails to achieve the desired effect after it has been taken, the open-loop controller has no way to compensate for the error, although it can avoid making the same mistake again.

In comparison, a closed-loop feedback policy can achieve significantly greater error robustness. By adding time dependence to the state vector we obtain a useful forward model for a closed-loop policy, namely $q_{k+1}=f(q_k,a)$.

Note that our model now describes the one-step-ahead evolution of the state vector over time. As we mentioned above, the model does not have to explicitly include application specific states like the number of color models. The application specific states are unlikely to be affected by the task and data parallel strategy. In this example, we would generate a family of forward models which are indexed by the number of color models, and learn them independently. Similarly, pairs of system states may be only weakly coupled, and so it may not be necessary to model all of their interactions as well.

The simplest closed-loop control policy for the closed-loop model is known as a dead-beat regulator. It operates by determining the desired state $q_d$ according to the system goal g. It then searches the forward model for the action which maps the current state as close as possible to the desired state. The details of this process are well-known. The key difference between this regulator and the open-loop one is the fact the correction iterates until the difference between the current and desired state is reduced to some acceptable level. Thus, even if the forward model is erroneous for some states, there is still the opportunity to converge to the desired goal.

The final choice is the Linear Quadratic Regulator whose control law is determined by weighting the squared tracking error relative to the energy in the control input. It is primarily useful for systems with a significant amount of model error or limits on control magnitude. In the event that this solution would be required for our application class, the details of performing this determination are well know.

Exploration

The difference between learning control and classical control is that the models describing the state-action relationship are not available a priori in the former. Under normal conditions in learning control, the operation of searching with the forward model for the action which attains the desired goal will conduct local exploration of the state-task space. In many cases this may result in an increasingly accurate forward model without any additional intervention. From time to time, however, it may be desirable to deliberately explore uncharted portions of the space, making the learned model more robust and comprehensive.

This task of generating actions which would lead to greater coverage of the input space is called exploration. The exploration component can follow several strategies in achieving its goal, and they can be interleaved with the normal execution of task and data parallel strategy. The most obvious strategy is to uniformly or randomly sample the state space. A more complex strategy, computes an uncertainty for each prediction which can be used to focus search efforts in the regions which are least understood.

There are two possible approaches to control learning which we call on-line and off-line. Off-line memory-based learning is straightforward and does not involve an explicit exploration step. During the normal execution of the application the controller would log the state-action pairs that form the input data to the learning process. Regression could then be performed off-line to produce forward and inverse models.

The difficulty with this strategy in practice is that, given the large size of the state space, it seems unlikely that "unforced" execution of the application is going to provide substantial information about the consequences of different data parallel decisions. In contrast, the goal of an on-line approach is to build the model while simultaneously driving the system to a desired goal.

This approach combines exploration with the search for a good action, and it is more difficult for two reasons. First, if the forward model is unfavorable, then it may be difficult to obtain a satisfactory approximation on the basis of a few data points. This can lead to difficult initialization problems in which the system does not remain stable long enough to acquire the data it needs to improve its model. Second, the cost of model learning must be amortized over the cost of implementing the controller, leading to a more computationally costly solution.

Fortunately however, the class of controllers we have adopted has already been applied successfully to the real-time on-line control of a robot arm, which suggests that it may be feasibly applied to in our domain as well. Equally fortunately, the data parallel scheduling problem has a key attribute which makes the initialization problem must less significant than it normally is for physical systems.

By construction, every possible control action corresponds to a well-posed task and data parallel strategy, in the sense that the application will run successfully under it. Thus even if the initial guess for the correct action is wildly incorrect, it will not cause the experimental run to terminate. The controller is free during its next epoch to try a new strategy and can continue in this manner indefinitely.

This stands in contrast to a physical system in which certain control actions may result in instability, ending the experiment. For example, in learning controllers for juggling robots, once the balls have been dropped the system can gain no more useful information. In our case, the only barrier to continuing an experimental run is that the application performance may not be acceptable to the user. But of course any initial knowledge the user may have about the correct strategy can be used to initialize the learned forward model.

Process for On-Line Learning

We now briefly review the process by which our learning system of FIG. 4 is applied to perform on-line learning. The controller runs at a sampling rate well below the rate of execution of the application and run-time system, since too frequent a change in the task and data parallel strategy would lead to poor performance. The run-time system measures the state for the controller and accepts actions at the controller's rate. Each time the controller block is executed it updates, the model and reevaluates the task and data parallel strategy. We refer to a single execution as a control epoch.

The following pseudo-code gives the steps that are followed in each epoch. It assumes that a forward model is being used for on-line learning. It should be clear how to modify the procedure to include other scenarios.

| PSEUDO-CODE |
|---|
| 1  Read new goal, if present. |
| 2  Loop over number of allowed tries. |
| 3      Read updated application and system state. |
| 4      Compute current value of goal. |
| 5      Goal currently met? If yes, exit. |
| 6      Loop until current goal value converged or iterations exceeded. |
| 7          Invert forward model numerically to find the desired action, given the current state and goal. |

-continued

PSEUDO-CODE

| 8 | Action available with above-threshold confidence? |
| --- | --- |
|  | If no, call exploration task to get new action. |
| 9 | Command the desired action from the run-time system. |
| 10 | Read updated application and system state. |
| 11 | Add state-action pair to forward model data set. |
| 12 | Compute current value of goal. |
| 13 | End of goal loop. |
| 14 | Goal currently met? If yes, exit. |
| 15 | Call exploration task and take the resulting action. |
| 16 | End of trial loop. |

EXAMPLE

Figure 7:
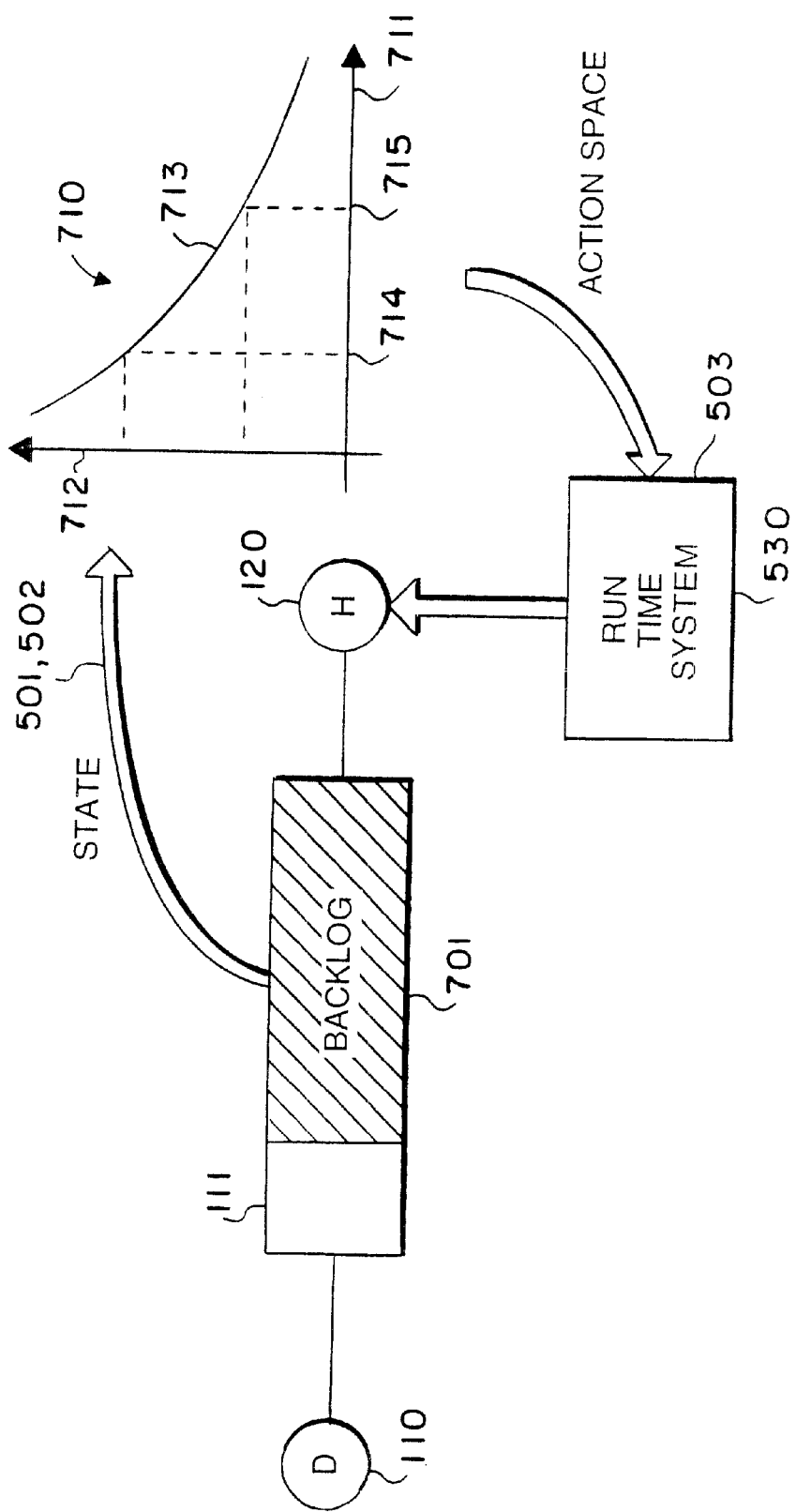
FIG. 7 is a block diagram of measuring and applying tasks and data parallel strategies.

FIG. 7 shows the learning and applying of a forward model based on a single control epoch. After the system has been initialized, the digitizer task 110 produces frames of the sequence at one rate, and the color tracker task 140 processes the frames at another rate. The controller 530 measures states 501 and 502 of the application so that it can determine, for example, the rate at which the "backlog" 701 is increasing (or decreasing). The backlog rate is the first derivative of the rates, which can be estimated using numerical differentiation on the backlog from two consecutive time steps.

A forward model 710 of the rate is illustrated in graph 710, where 711 is the number of worker tasks 302, and 712 indicates the backlog rate. The curve 713 shows that as the number of worker task is increased, the backlog rate decreases task.

Note, the curve 710 expresses the relationship between the backlog rate and the number of workers as a continuous function. In reality, the system is discrete, although it may still be convenient to treat it as a continuous function. The upper bound on the backlog rate is the rate at which the "upstream" producer (task 110) can produce data items, assuming that tasks 120 is the only consumer. The backlog rate attains zero when the number of workers is such that all of the input items can be processed in one iteration through the set of worker tasks.

The forward model 710 can be searched by the controller 530 to identify the number of workers necessary to reduce the backlog rate to an acceptable level. This state increment is commanded to the run-time system as the action space 503.

Figure 8:
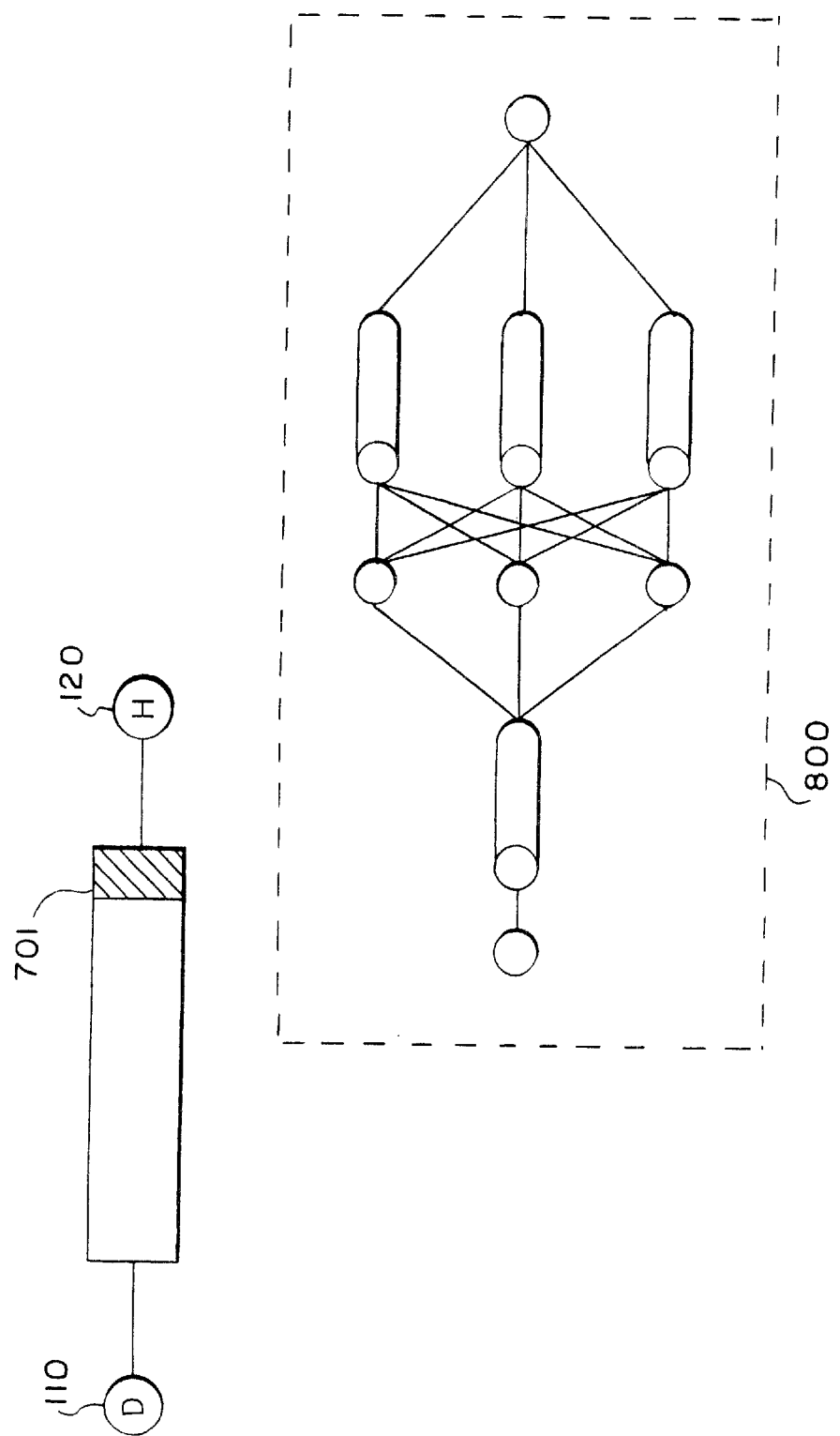
FIG. 8 is a block diagram of a taks before and after applying a data parallel strategy.

FIG. 8 shows the system after application of a data parallel strategy to reduce the backlog 701. The nodes and edges inside box 800 are the splitter, worker, and joiner tasks that achieved the desired goal.

It is understood that the above-described embodiments are simply illustrative of the principles of the invention. Various other modifications and changes may be made by those skilled in the art which will embody the principles of the invention and fall within the spirit and scope thereof.

We claim:

1. A system for integrating task and data parallelism for a dynamic application including at least one task for real-time processing of a continuous input data stream to produce an output data stream, comprising:

a splitter task partitioning the input data stream into a plurality of individually marked data chunks;

a work queue storing the data chunks;

a variable number of worker tasks processing subsets of the data chunks from the work queue, each worker task being an instance of the at least one task;

a controller queue storing a control item for each data chunk, the control item including task and data strategy provided by the splitter task; and a joiner task combining the processed data chunks dependent on the control items on the controller queue to produce the output data stream.

2. The system of claim 1 wherein the plurality of data chunks are continuous and time-varying data of the input and output data streams.

3. The system of claim 2 wherein each data chunk includes at least part of one data item, and means for temporally ordering the data items in the input and output data streams using time-stamp values.

4. The system of claim 3 wherein each data stream corresponds to a spatially ordered memory port.

5. The system of claim 4 including means for accessing the data items using space coordinates of the ports and time coordinates of the data items.

6. The system of claim 1 wherein the input data stream is a sequence of time-ordered video frames.

7. The system of claim 6 wherein each data chunk is a portion of one of the video frames of the sequence.

8. The system of claim 2 including means for dynamically varying the number of worker tasks over time.

9. The system of claim 1 including means for associating the task and data parallel strategy with each chunk.

10. The system of claim 9 wherein each task and data parallel strategy includes methods for processing the associated chunk.

11. The system of claim 10 wherein the methods include the worker tasks.

12. The system of claim 1 including means for learning and applying a task and data parallel strategy to the application.

13. The system of claim 12 including a controller measuring an execution of the application to generate an action space representing a task and data parallel strategy; and a run-time system applying the action space to implement the task and data parallel strategy.

14. A method for integrating task and data parallelism for a dynamic application including at least one task for real-time processing of continuous input data stream to produce an output data stream, comprising the steps of:

splitting the input data stream into a plurality of individually marked data chunks by a splitter;

storing the data chunks in a work queue;

processing subsets of the data chunks by a variable number of worker tasks, each worker task being an instance of the at least one task;

storing a control item for each data chunk in a controller queue, the control item including task and a data strategy provided by the splitter task; and combining the processed data chunks by a joiner task dependent on the control items on the controller queue to produce the output data stream.

* * * * *